Jan. 26, 1960 G. F. SCOTT 2,922,219
TOOL HOLDER
Filed Dec. 30, 1954
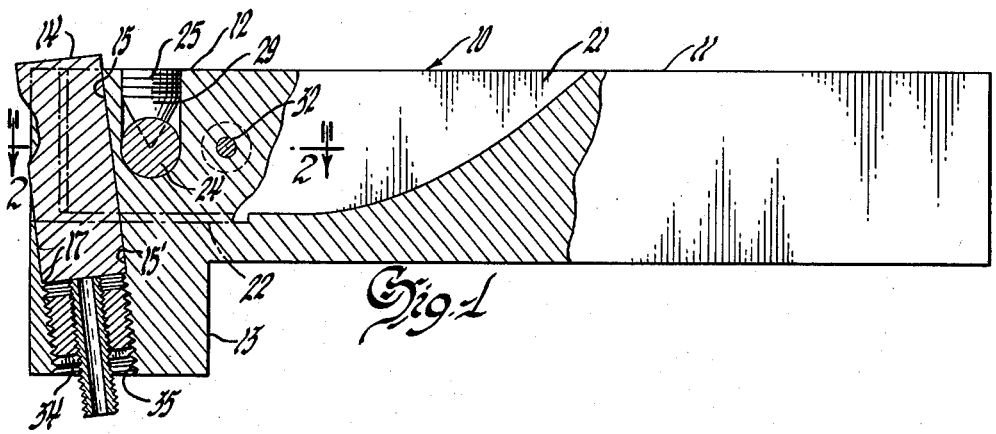
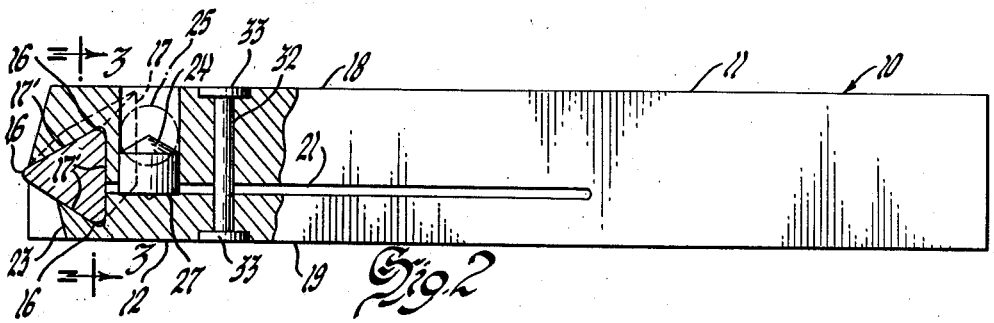
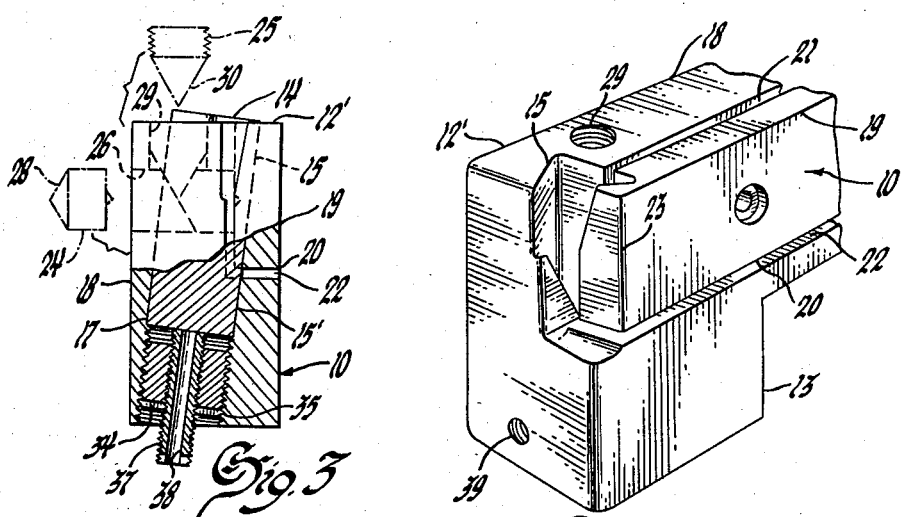
INVENTOR
Guy F. Scott
BY
S. E. Ross
ATTORNEY United States Patent Office 2,922,219
Patented Jan. 26, 1960

2,922,219

TOOL HOLDER

Guy F. Scott, Ferndale, Mich., assignor to General Motors Corporation, Detroit, Mich., a corporation of Delaware Application December 30, 1954, Serial No. 478,590

2 Claims. (Cl. 29—96)

This invention relates to holding devices for cutting tools or bits for use with machine tools and more particularly to that type which supports the cutting tool in a socket adjacent the point of engagement with the work.

In operation of machine tools it is desirable that the cutting tool may be removed, replaced, and adjusted without disturbing the tool setup otherwise. For example, in lathes employing plural cutting tools side by side, it is an important factor in efficient operation that the operator be enabled to remove or adjust the cutting tool while the tool holder is in its operative position. Tool holders have been devised previously for facilitating this operation which secure the cutting toll in a tool retaining socket extending transverely of the tool holder body. These prior art devices, however, are subject to certain disadvantages such as the requirement of multiple and complex parts, inadequate support for the cutting bit, and a tendency to loosen when subjected to vibration and shock.

Accordingly, it is an object of this invention to provide an improved tool holder which facilitates removal of the cutting tool from the securing means with the tool holder in its operative position and which requires relatively few parts for the securing means.

A more specific object is to provide an improved tool holder and method of making the same which securely retains a cutting tool in position by a resilient jaw.

An additional object is to provide a tool holder and method of making the same having a resilient jaw which may be actuated with the tool holder in its operative position to permit insertion and removal of the cutting tool.

An additional object is to provide a tool holder having an integral resilient jaw which may be readily displaced for insertion and removal of the cutting tool and which is protected against breakage.

These and other objects of the invention and the manner in which they are achieved will become apparent from the description which follows taken with the accompanying drawings in which:

Figure 1 is an elevational view of the improved tool holder partially in section.

Figure 2 is a plan view of the improved tool holder in partial section taken on line 2—2 of Figure 1.

Figure 3 is an end view in partial section taken on line 3—3 of Figure 2.

Figure 4 is a perspective view of the head portion of the tool holder.

This invention comprises a tool holder having a resilient jaw which may be displaced from its unstressed position to secure the cutting tool against a reaction jaw by its tendency to return to the unstressed position. Means for operating the resilient jaw are provided to permit insertion and removal of a cutting tool and limit means are provided to prevent the breakage of the resilient jaw. The tool holder body is preferably formed from an elongated body of resilient metal by cutting a tool socket in one end thereof and dividing the body longitudinally through the socket to form jaws. The jaws are then clamped together and heat treated to relieve the internal stresses. Thus the jaws provide gripping effort, when spread apart, upon a tool inserted in the socket.

Referring now to the drawings, there is shown an illustrative embodiment of the inventive tool holder suitable for use in a lathe. The body 10 of the tool holder comprises an elongated rectangular shank 11 terminating in a head 12 including a depending shoulder 13. For use in the conventional manner, the shank 11 is adapted to be supported in a generally horizontal position in a tool post (not shown) to position the head 12 adjacent a rotating workpiece. A cutting tool 14 of hardened material such as a tungsten carbide is supported by the head 12 in a tool socket 15. The cutting tool is preferably of polygonal configuration in cross section and in the illustrative embodiment is triangular, providing three cutting edges 16 at each end. The symmetry of the cutting tool 14 permits the selection of any of the cutting edges 16 by proper orientation of the tool in the socket 15.

The tool socket 15 in head 12 is of triangular configuration conforming to that of the cutting tool 14. The socket 15 extends from the upper face 12' of the head 12 transversely of the body 10 through an uninterrupted portion 15' to the socket base 17 in shoulder 13. The socket 15 is bounded by walls 17' and is inclined suitably with respect to the shank 11 to present cutting edge 16 to the workpiece at an appropriate angle. As will appear subsequently, the tool holder body 10 is preferably of integral construction and is formed from a generally rectangular metal bar. The body 10 in this integral construction is of a metal having good resilient properties such as a chromium-vanadium steel. In sequence, the method of forming the preferred structure includes the steps of providing the rectangular body 10 with depending shoulder 13 and then cutting socket 15. The tool socket 15 may be suitably cut by drilling and broaching operations to the desired configuration.

The tool holder body is formed with a reaction jaw 18 and a laterally juxtaposed resilient jaw 19 extending throughout the head 12. The jaw 19 is of narrow width relative to that of jaw 18 to permit spring-like deflection whereas jaw 18 is relatively rigid. The jaws 18 and 19 longitudinally divide the body portion 10 in a vertical plane through the tool socket 15 and are integrally connected in the shank 11. The depth of resilient jaw 19 is somewhat less than the depth of tool socket 15 and thus terminates at its lower edge 20 above the socket base 17 and shoulder 13. The jaw 19 is preferably formed by cutting a vertical slot 21 through the head 12 to the desired depth and cutting a horizontal slot 22 coextensive with and perpendicularly intersecting slot 21. The slots 21 and 22 are suitably cut by a milling machine operation. The outer end 23 of the jaw 19 is cut away to provide suitable clearance for the cutting tool 14.

To provide for gripping effort of the jaws 18 and 19 on the cutting tool 14 the resilient jaw 19 is deformed at its outer end 23 to a position closely adjacent reaction jaw 18 such that the tool socket 15 is distorted from its original shape. This is accomplished by clamping the resilient jaw 19 inwardly against the reaction jaw 18 and subjecting the body 10 to a heat treatment to relieve the internal stresses created by the deformation. By way of example, the tool holder body may be formed of a chromium-vanadium steel such as that designated as A.I.S.I. 6150 (American Iron and Steel Institute). A suitable heat treatment is as follows: The tool holder body is heated to 1575 degrees F. for one and one-half hours and then oil quenched. To temper the body it is then heated to approximately 850 degrees F. for two hours.

Actuation of the jaw 19 from the unstressed position to restore the tool socket 15 to its undistorted shape sets up internal stresses which produce an effort or tendency of jaw 19 to return to its unstressed position. Operation of the jaw 19 to permit insertion and removal of the cutting tool 14 is provided for by plunger 24 and set screw 25. The plunger 24 is slidably disposed in laterally extending passage 26 and is in abutment at its inner end 27 with resilient jaw 19. The outer cone-shaped end 28 of plunger 24 projects into the vertical, internally threaded, passage 29. The set screw 25 is threaded in passage 29 and has a cone point 30 engaging cone-shaped end 28 of plunger 24. Rotation of set screw 25 to advance it into passage 29 produces a camming or wedging engagement between the cone point 30 and the cone shaped end 28 of plunger 24 and thereby displaces the resilient jaw 19 away from the reaction jaw 18. In order to prevent breakage of jaw 19, stop means or rivet 32 is provided. The rivet 32 extends laterally through the jaws 18 and 19 and is provided at each end with a head 33. The rivet is of such length that the jaw 19 cannot be displaced appreciably beyond the position in which the tool socket 15 is undistorted.

An adjusting screw 34 to permit adjustment of tool 14 in tool socket 15 is disposed in threaded passage 35 and is aligned wtih socket 15. Since the threaded passage terminates at the base 17 of socket 15, additional adjustment is permitted by elongated adjusting screw 37 extending coaxially through adjusting screw 34 in threaded engagement therewith. The adjusting screw 37 defines a passage 38 opening into tool socket 15 to accommodate a knock out pin (not shown) for removal of the cutting tool 14. The adjusting screw 34 may be locked in position by a set screw (not shown) in threaded bore 39.

Operation of the tool holder to remove and insert the cutting tool 14 will now be apparent. To spread the jaws 18 and 19 the set screw 25 is advanced into engagement with plunger 24. This displaces the resilient jaw 19 away from the reaction jaw 18 and the undistorted shape of the socket 15 is restored and the tool 14 is freely movable therein. Upon withdrawal of the set screw 25, the resilient jaw 19 tends to return to its unstressed position and exerts firm gripping effort on the tool 14 against the reaction jaw 18.

The advantages of the inventive tool holder will now be appreciated. The cutting tool 14 is firmly seated on the adjusting screw 37 in the uninterrupted portion 15' of the tool socket in shoulder 13. Since the tool 14 is resiliently gripped by the jaws 18 and 19 which conform to its configuration, the tool 14 is securely retained in position. The operation of the jaw 19 by the easily accessible set screw 25 permits the tool 14 to be removed and inserted while the tool holder is in its operative position. Adjustment of the tool 14 may be made by adjusting screw 34 or screw 37 without disturbing the tool setup otherwise.

This invention has been described with respect to a particular embodiment for illustrative purposes only and such embodiment is not to be construed in a limiting sense; numerous modifications and variations within the spirit and scope of the invention will now occur to those skilled in the art. For a definition of the invention, reference is made to the appended claims.

I claim:

1. A tool holder comprising a rigid shank terminating in a reaction jaw with a depending shoulder, a resilient jaw opposite the reaction jaw and extending convergently therewith from an integral connection with said shank, said jaws having misaligned grooves which extend transversely of said shank toward said shoulder and define a deformed tool socket in the normal position of said resilient jaw, manually actuable jaw operating means interposed between the jaws for displacing the resilient jaw away from the reaction jaw to align said grooves and reform said tool socket so that the jaws are adapted to receive a tool having a cross-section corresponding to the reformed tool socket and provide lateral support therefor by the force of the resilient jaw, said shoulder being disposed adjacent one end of the tool socket and being adapted to provide thrust support for a tool in said tool socket.

2. A tool holder comprising a body with a generally rectangular shank and a head portion having a depending shoulder, said body being longitudinally divided in two transverse, intersecting planes through the head portion to form a reaction jaw and laterally juxtaposed resilient jaw, said resilient jaw being separate from and normally deformed toward said reaction jaw throughout said head portion and being connected therewith in said shank portion, said reaction jaw including wall portions defining a first tool socket portion in said head portion, actuating means for forcibly displacing said resilient jaw away from said reaction jaw and for releasing said resilient jaw in the displaced condition to permit self-clamping return thereof, said jaws including oppositely disposed wall portions defining a second tool socket portion aligned, in the displaced condition of said resilient jaw with the first tool socket portion permitting the insertion of a tool into said socket, and an adjusting screw in said shoulder extending coaxially into said socket for positioning a tool in said socket.

References Cited in the file of this patent

UNITED STATES PATENTS

| Number | Name | Date |
|---|---|---|
| 79,684 | Pratt | July 7, 1868 |
| 663,455 | Muehlberg | Dec. 11, 1900 |
| 770,273 | Dyer | Sept. 20, 1904 |
| 926,882 | Lang | July 6, 1909 |
| 1,008,022 | Duncan | Nov. 7, 1911 |
| 1,053,364 | Dick | Feb. 18, 1913 |
| 1,104,541 | Phelan | July 21, 1914 |
| 1,319,950 | Davey | Oct. 28, 1919 |
| 1,397,357 | Bronander | Nov. 15, 1921 |
| 2,275,327 | Sheridan | Mar. 3, 1942 |
| 2,357,918 | Trippler | Sept. 12, 1944 |
| 2,358,499 | Fiedler | Sept. 19, 1944 |
| 2,384,204 | St. Clair | Sept. 4, 1945 |
| 2,485,052 | Keebler | Oct. 18, 1949 |
| 2,553,699 | Brodin | May 22, 1951 |
| 2,651,223 | Hahn | Sept. 8, 1953 |
| 2,655,099 | Rickenbach | Oct. 13, 1953 |
| 2,666,723 | Stewart | Jan. 19, 1954 |

FOREIGN PATENTS

| Number | Country | Date |
|---|---|---|
| 704,143 | France | Feb. 17, 1931 |

OTHER REFERENCES

Kennametal Cemented Carbide Products Catalog 49, issued May 1949.